US007055516B2

(12) United States Patent
Choi (10) Patent No.: US 7,055,516 B2
(45) Date of Patent: Jun. 6, 2006

(54) STONE SLICER (76) Inventor: Kuei Tai Choi, 530-37 Masan-ri Yeonmu-eup, Nonsan-si, Chungcheongnam-do 320-834 (KR)

( * ) Notice: Subject to any disclaimer, the term of this patent is extended or adjusted under 35 U.S.C. 154(b) by 0 days.

(21) Appl. No.: 10/520,851

(22) PCT Filed: Jul. 21, 2003

(86) PCT No.: PCT/KR03/01440

§ 371 (c)(1),
(2), (4) Date: Jan. 11, 2005

(87) PCT Pub. No.: WO2004/009310

PCT Pub. Date: Jan. 29, 2004

(65) Prior Publication Data

US 2005/0235977 A1 Oct. 27, 2005

(30) Foreign Application Priority Data

Jul. 23, 2002 (KR) .................... 10-2002-0043137

(51) Int. Cl.
*B28D 1/08* (2006.01)
*B24B 21/00* (2006.01)

(52) U.S. Cl. .............. 125/21; 125/16.02; 451/296
(58) Field of Classification Search ............ 451/296, 451/304, 311; 125/16.01, 18, 21, 30.02, 125/16.02
See application file for complete search history.

(56) References Cited

U.S. PATENT DOCUMENTS 3,847,569 A * 11/1974 Snow ................ 51/309
RE29,491 E * 12/1977 Snow ................ 51/309
5,690,092 A * 11/1997 Ogyu ................ 125/21
6,513,514 B1 * 2/2003 Micheletti ............ 125/21

FOREIGN PATENT DOCUMENTS

EP  WO 93/14914  * 5/1993

* cited by examiner

*Primary Examiner*—Eileen P. Morgan
(74) *Attorney, Agent, or Firm*—Rabin & Berdo, PC (57) ABSTRACT

A stone slicer of slicing rough stone into stone plates having a predetermined thickness, which can improve productivity by reducing consumption of the rough stone by minimizing the thickness of a cut portion cut by a saw blade, and can reduce the treatment cost of sludge generated when the stone is sliced and prevent pollution due to the generated sludge. The stone slicer includes a base (10) on which stone is placed, four columns (22, 24, 26, 28) vertically installed at four edges of the base (10), a pair of a pair of platforms (30, 30') installed left and right so as to be capable of simultaneously elevating along either side of the columns (22, 24, 26, 28), platform driving means (40, 40') for elevating the platforms (30, 30'), one or more endless track type belt saws (70) each having opposite ends mounted in parallel with driving pulleys (50) and driven pulleys (60) provided at the platforms (30, 30'), and belt saw driving means (80) for driving the belt saws (70) to slice the stone placed on the base (10) to a predetermined thickness while rotating along an endless track by rotating the driving pulleys (50).

3 Claims, 7 Drawing Sheets

STONE SLICER

TECHNICAL FIELD

The present invention relates to a stone slicer, and more particularly, to a stone slicer in which a plurality of belt saws circulating along an endless track are installed between opposite platforms in parallel with one another, and stone placed on a base is sliced to a predetermined thickness while the belt saws circulate as the platforms fall down. Consumption of stone and generation of sludge can be reduced compared to a conventional circular shank type slicer.

BACKGROUND ART

In a conventional stone slicer, a circular shank for slicing stone thinly or to a predetermined thickness has been employed. The conventional circular shank has a thickness of 5 to 6 mm, and 8 to 8.5 mm thick diamond tips must be overcoated thereon to allow slicing. The amount of stone consumed is approximately 30% of rough stone. Thus, the slicing cost becomes high and a considerable cost is also required in treating stone sludge produced during slicing. Hence, the stone slicing work is burdensome and has low efficiency.

DISCLOSURE OF THE INVENTION

To solve the problems of the conventional circular shank type stone slicer, it is an object of the present invention to provide a stone slicer of slicing rough stone into stone plates having a predetermined thickness, which can improve productivity by reducing consumption of the rough stone by minimizing the thickness of a cut portion cut by a saw blade, and can reduce the treatment cost of sludge generated when the stone is sliced and prevent pollution due to the generated sludge.

To achieve the object of the present invention, there is provided a stone slicer comprising a base on which rough stone is placed, four columns vertically installed at four edges of the base, a pair of platforms elevatably installed at the columns left and right, platform driving means for driving the platforms to elevate, one or more endless track type belt saws each having opposite ends mounted in parallel with driving pulleys and driven pulleys provided at either side of the platforms, and belt saw driving means for driving the rough stone placed on the base to be sliced to a predetermined thickness while the belt saws rotate endlessly by rotating the driving pulleys.

The belt saws are formed of a thin metal plate and have strong slicing tips installed on the bottom of the belt saws at a constant interval. The stone is sliced during rotation of the belt saws mounted between the driving pulleys and the driven pulleys.

The driving pulleys provided at the platforms are driven by a power transmission mechanism in which the same driving power is transmitted from one driving means to the driving pulleys.

BEST MODE FOR CARRYING OUT THE INVENTION

For the purposes of promoting an understanding of the present invention, reference will be now be made to the embodiments illustrated in the accompanying drawings.

Figure 1:
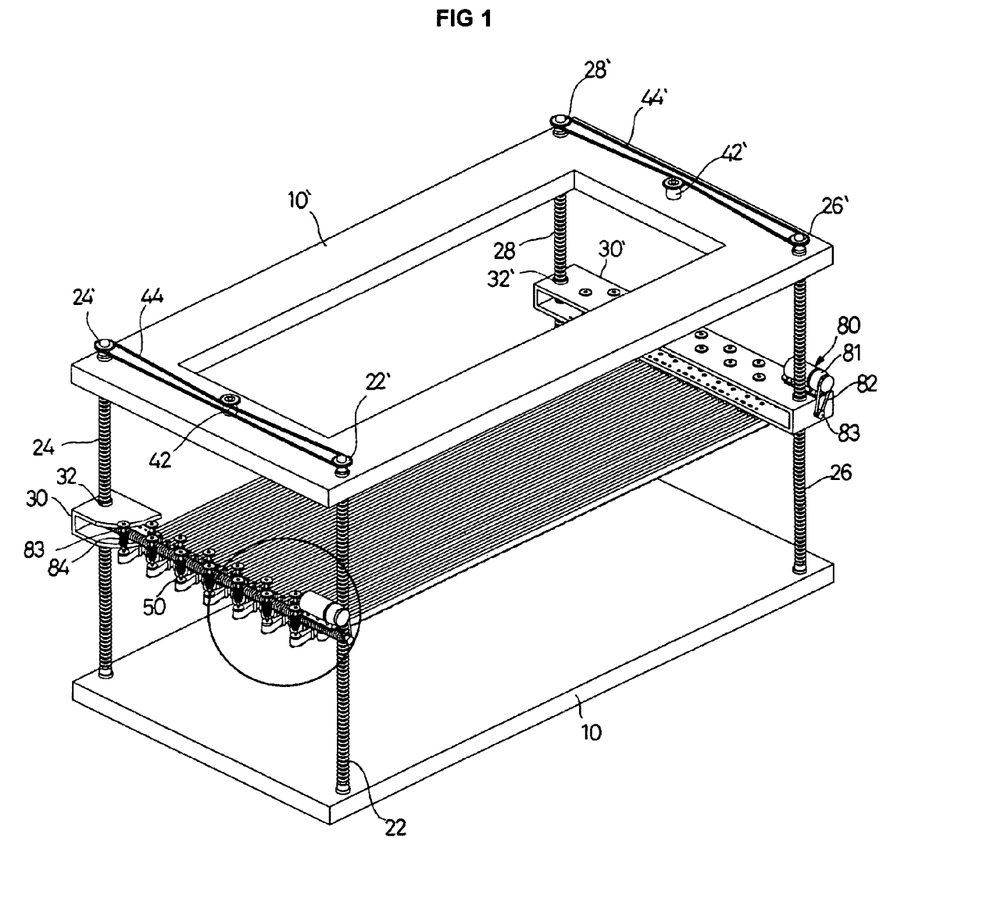
FIG. 1 is a perspective view of a stone slicer according to the present invention.
Figure 2:
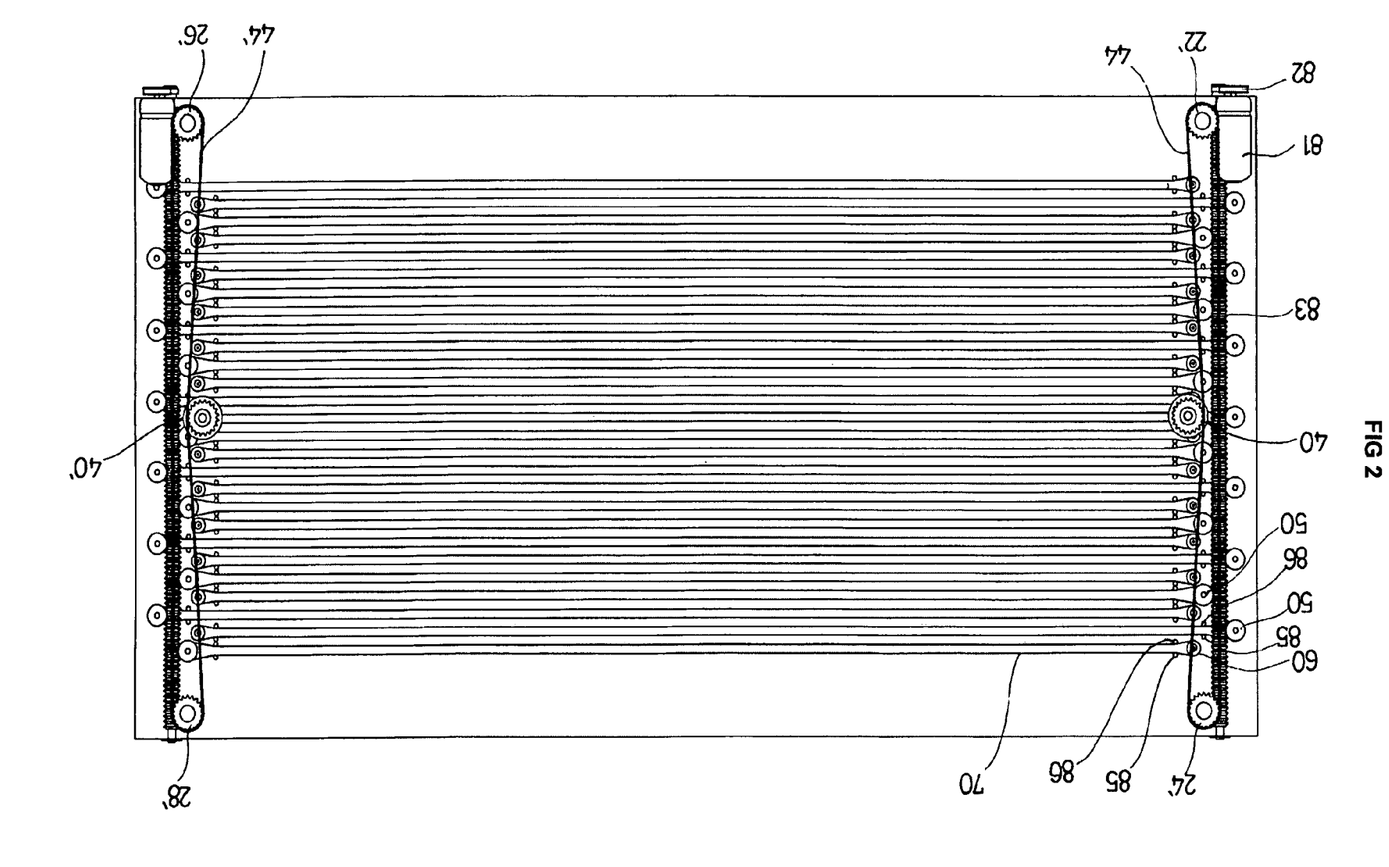
FIG. 2 is a plan view of the stone slicer according to the present invention.
Figure 3:
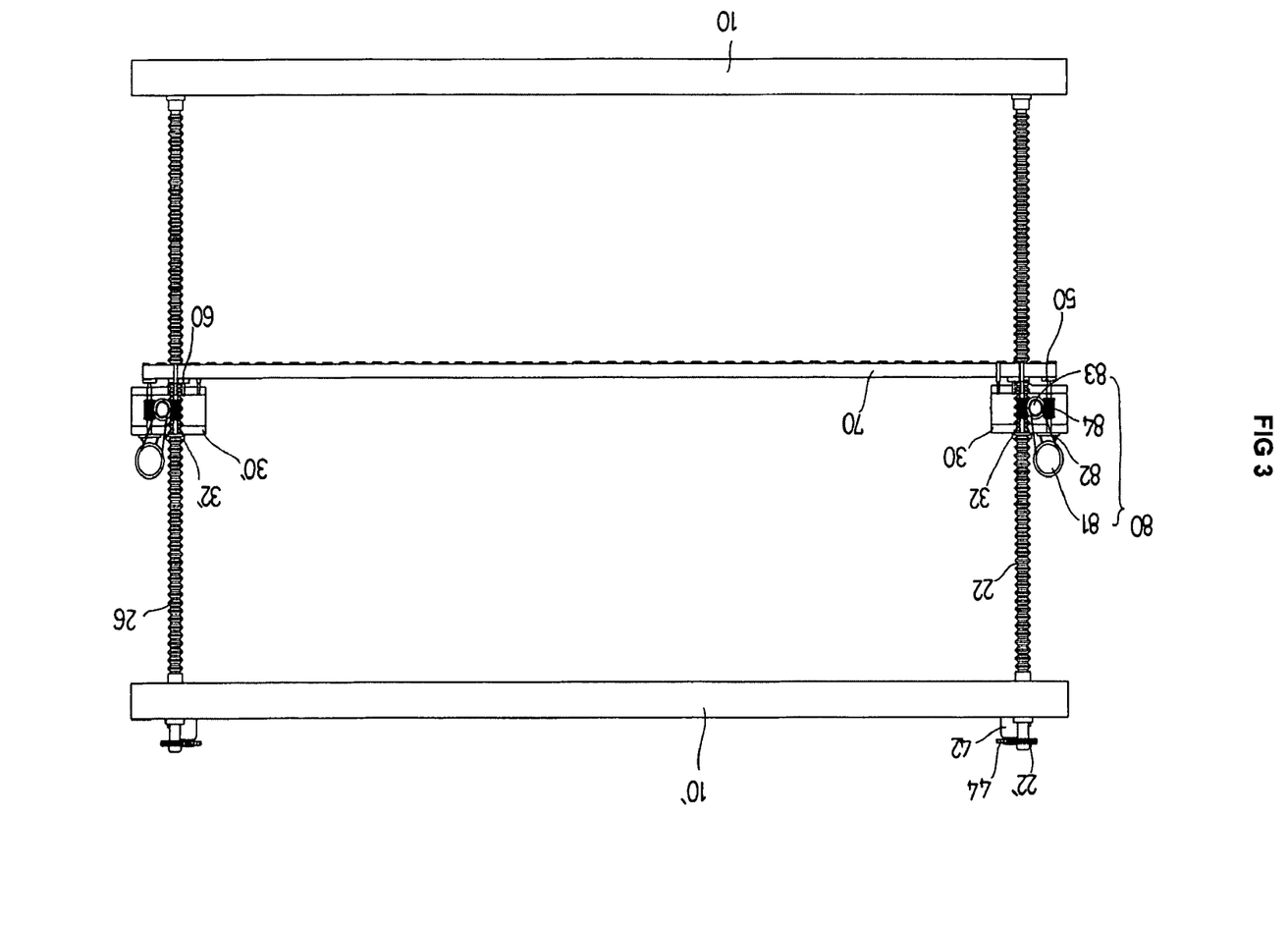
FIG. 3 is a front view of the stone slicer according to the present invention.
Figure 4:
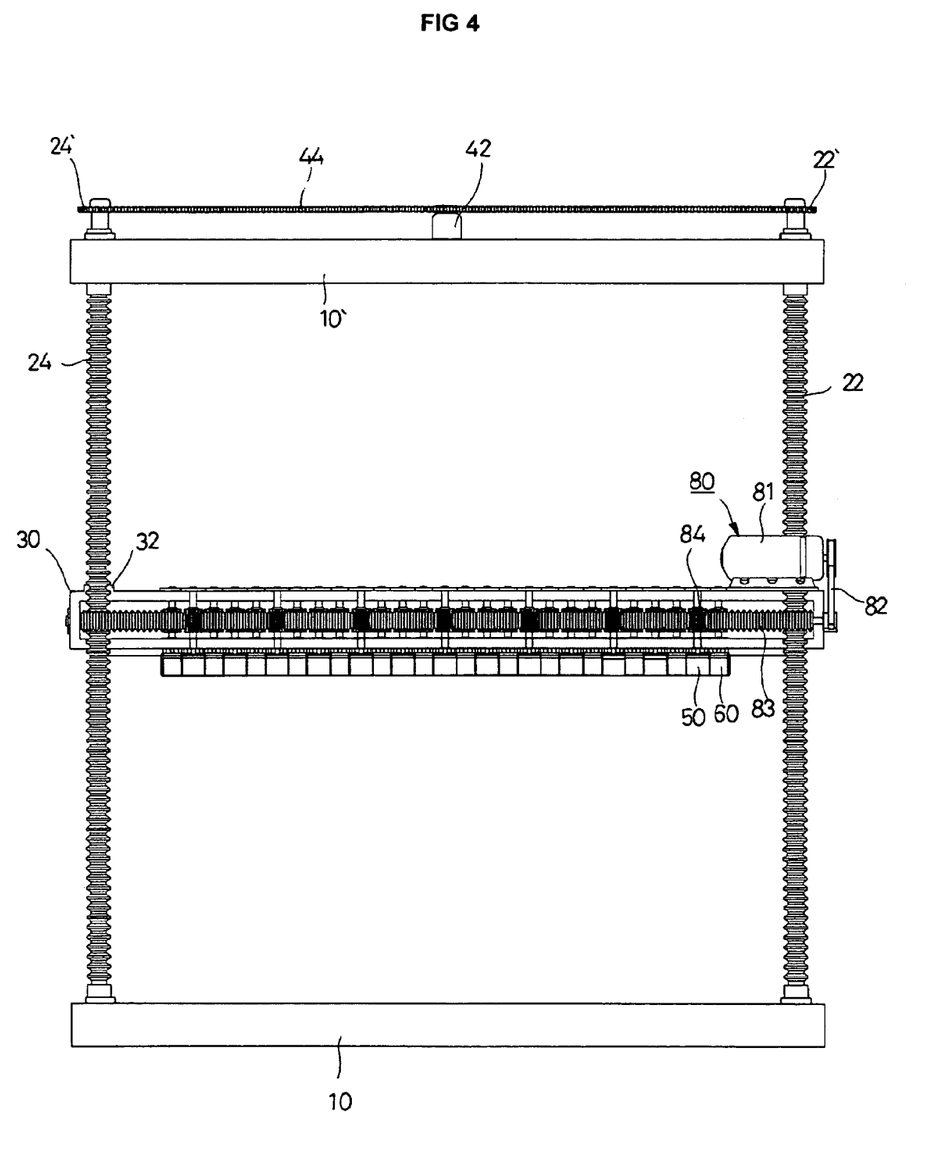
FIG. 4 is a side view of the stone slicer according to the present invention.

FIG. 1 is a perspective view of a stone slicer according to the present invention, FIG. 2 is a plan view of the stone slicer according to the present invention, FIG. 3 is a front view of the stone slicer according to the present invention, and FIG. 4 is a side view of the stone slicer according to the present invention.

As shown in FIGS. 1 through 4, the stone slicer according to the present invention includes a base 10 on which stone (not shown) is placed, four columns 22, 24, 26, 28 vertically installed at four edges of the base 10 and having upper ends rotatably fixed on edges of an upper plate 10', a pair of platforms 30, 30' installed left and right so as to be capable of simultaneously elevating along either side of the columns (22, 24), (26, 28), platform driving means 40, 40' for elevating the platforms 30, 30', one or more endless track type belt saws 70 each having opposite ends mounted in parallel with driving pulleys 50 and driven pulleys 60 provided at the platforms 30, 30', and belt saw driving means 80 for driving the belt saws 70 to slice the stone placed on the base 10 to a predetermined thickness while rotating along an endless track by rotating the driving pulleys 50.

The base 10 is fabricated using a strong, durable material so as to withstand the weight of large-sized stone to be placed thereon and sliced. Also, the base 10 must be installed on solid, horizontal ground for vertically cutting the stone. Front and rear sides of the base 10 are opened so as to allow the rough stone to be transported easily to be seated on the base 10 and to allow a stone plate sliced by the belt saws 70 to be transported easily.

Also, the base 10 may be fabricated in a left-right-separation type, so that separate base parts can be installed at opposite sides of solid and horizontal ground, respectively.

The columns 22, 24, 26, 28 are vertically installed in parallel with each other so that they can fully withstand the weight of the upper plate 10' and the platforms 30, 30' while guiding elevating operations of the platforms 30 and 30'. The platforms 30 and 30' are of a screw type, and the columns 22, 24, 26, 28 penetrate the platforms 30, 30'. Female-screw type guide bearings 32, 32' for guiding vertical elevation of the platforms 30, 30' are installed. The platforms 30, 30' are operable to elevate while the columns 22, 24, 26, 28 are rotated by the driving means 40, 40'.

Figure 5:
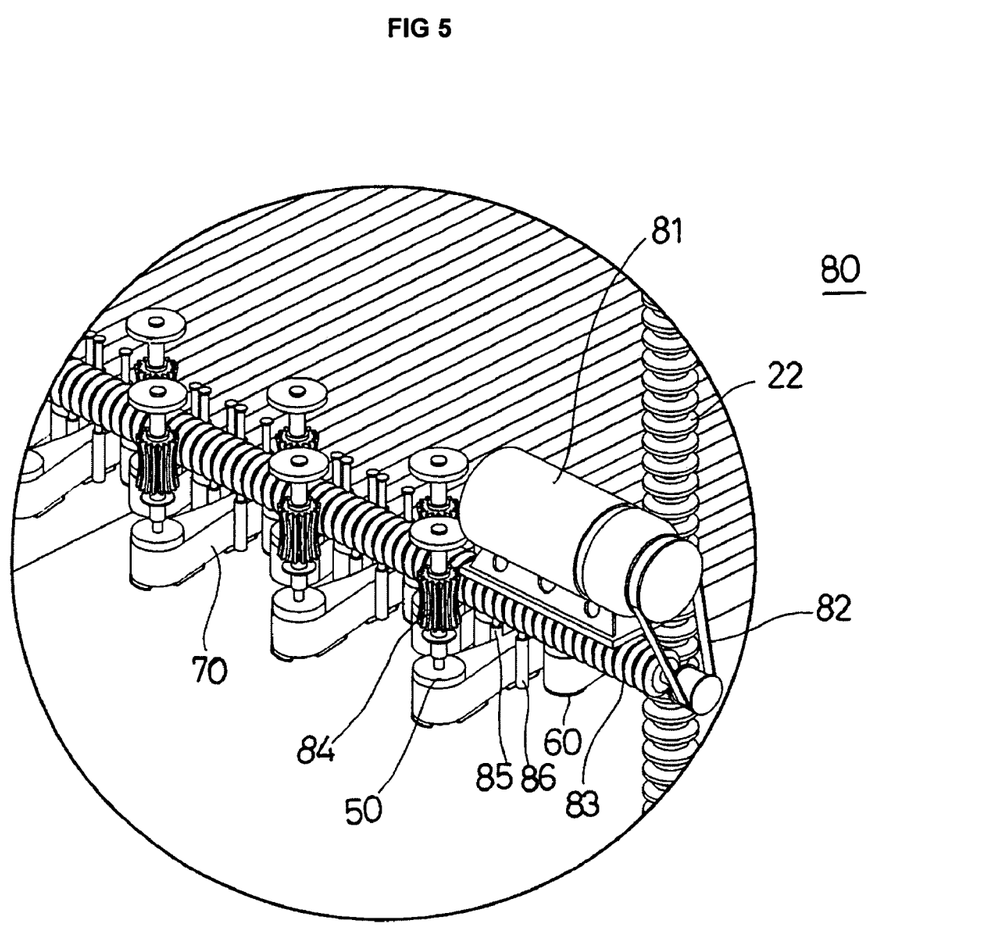
FIG. 5 is an enlarged perspective view of a portion "A" shown in FIG. 1, showing a belt saw driving means according to the present invention.

The platforms 30, 30' are substantially box-shaped, and have driving means 80 for driving the belt saws 70 installed therein. As shown in FIG. 5, the driving means 80 installed in the platform 30 includes a driving motor 81 operable by electricity, oil pressure or air pressure, a helical gear 83 connected to the driving motor 81 and a power transmission means 82 such as a belt or a chain to be driven and horizontally elongated in the front and rear directions of the platform 30, vertical gears 84 spaced apart a predetermined interval in the left and right of the helical gear 83 to be geared, and driving pulleys 50 axially-connected to the vertical gears 84. Each of the belt saws 70 is connected between the driving pulley 50 and the driven pulley 60 installed at the platform 30' to face the driving pulley 50, and the belt saws 70 each rotates along an endless track. The driving pulleys 50 and the driven pulleys 60 have a large diameter for securing stable rotation of the belt saws 70, thereby maintaining the belt saws 70 at a constant interval. Also, in order to impart tension to the belt saws 70, each pair of auxiliary pulleys 85, 86 are installed in the driving pulleys 50 and the driven pulleys 60, thereby adjusting the interval between the belt saws 70.

The driving means 40, 40' for elevating the platforms 30, 30' include driving motors 42, 42' installed at either side of the upper plate 10', sprockets 22', 24', 26', 28' installed at the upper end of the columns 22, 24, 26, 28, and chains 44, 44' installed between the columns 22, 24 and the driving motor 42 and between the columns 26, 28 and the driving motor 42'. As the driving motors 42, 42' of either side are synchronized and rotate forward and backward at a constant speed, the columns 22, 24, 26, 28 rotate and then the platforms 30, 30' threaded with the columns 22, 24, 26, 28 elevate accordingly.

Figure 6:
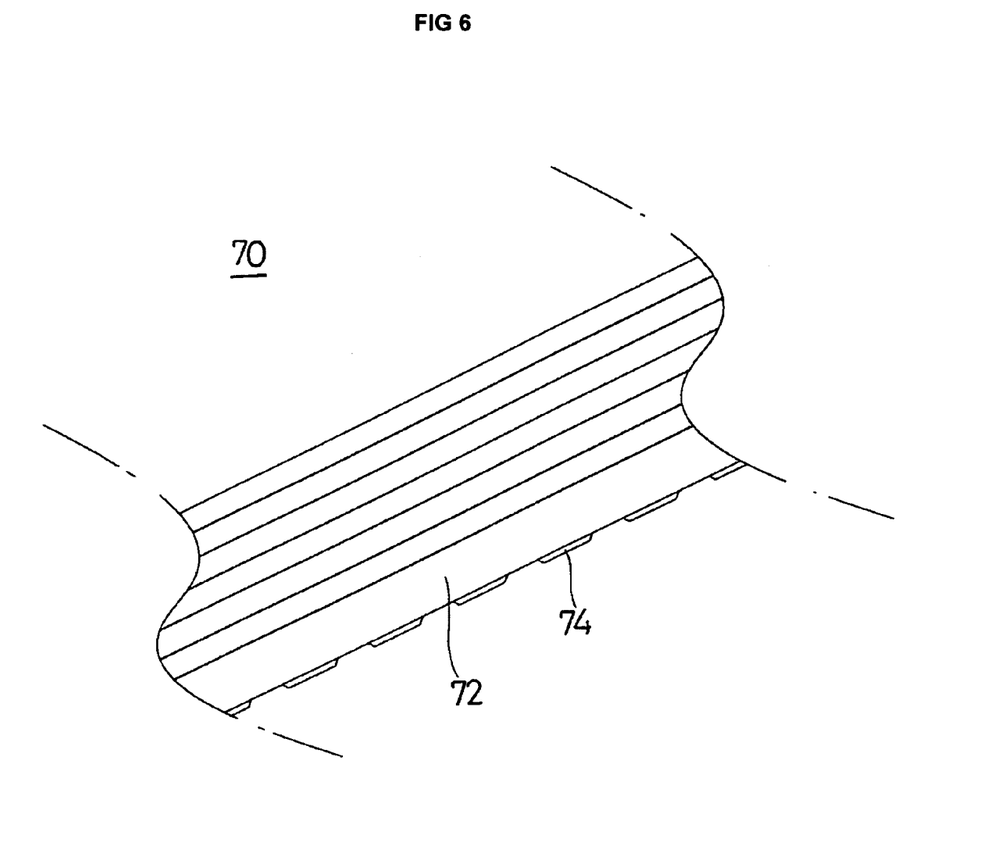
FIG. 6 is an enlarged perspective view of a belt saw of the stone slicer according to the present invention.

The belt saws 70 are fabricated using a thin metal plate, e.g., carbon steel, as shown in FIG. 6. Strong slicing tips 74 are welded on the bottom of the metal plate 72 at a constant interval to slice stone.

The stone slicer according to the present invention is configured to determine a slicing thickness of stone by designing an interval between the belt saws 70 into a desired dimension. Also, the interval between the platforms 30 and 30' and the height of each column can be determined in various manners so as to be suitable to the size of stone to be sliced.

Thus, the stone slicer according to the present invention can replace the conventional circular shank type stone slicer in stone cutting and processing fields.

Figure 7:
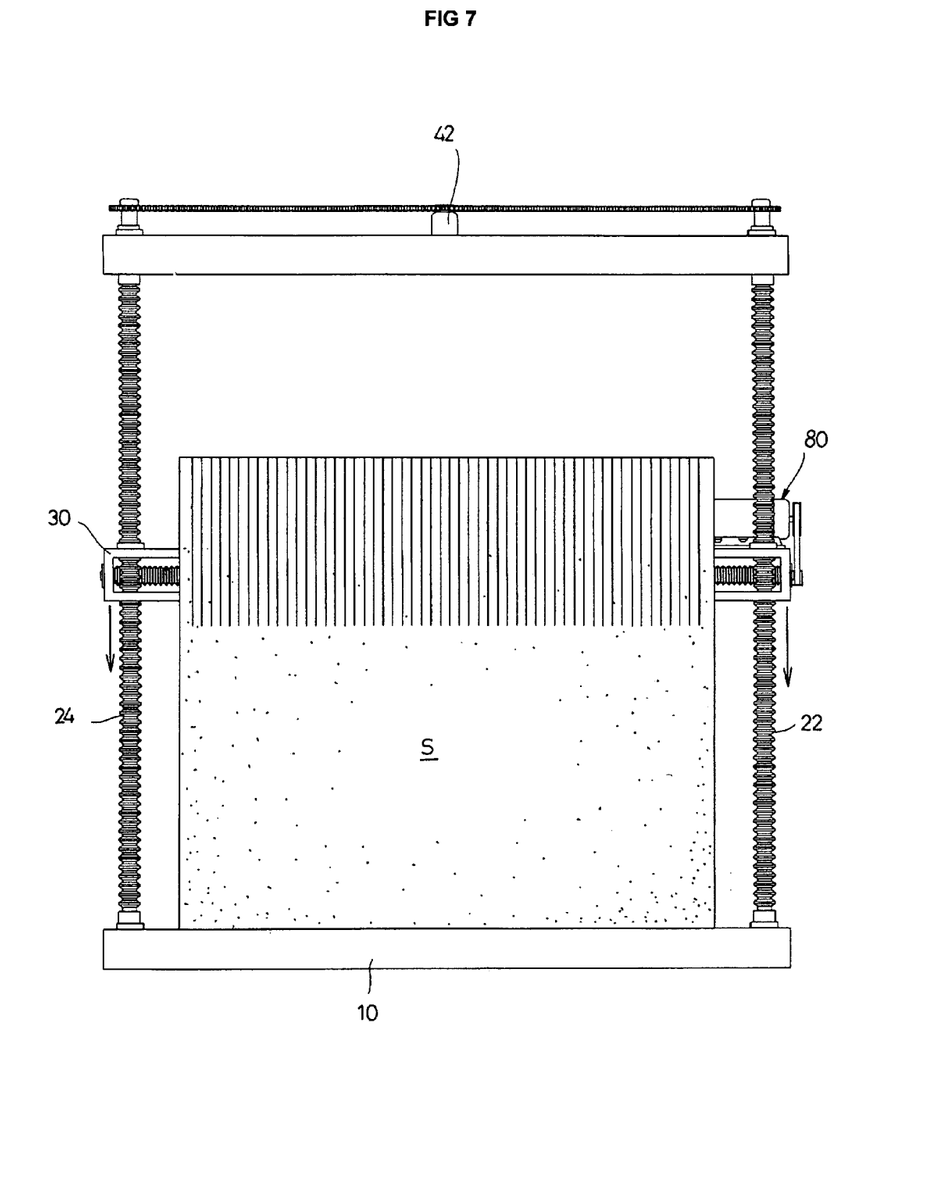
FIG. 7 is an operation state diagram of the stone slicer according to the present invention.

As shown in FIG. 7, in the stone slicer according to the present invention, in a state in which the platforms 30 and 30' are raised, stone S is placed on a base 10 and then the platforms 30 and 3' are lowered at the same speed to rotate the belt saws 70 in an endless track manner. Then, the belt saws 70 contact the top surface of the stone 3, which is then sliced by means of the slicing tips 74, producing slots. As the platforms 30 and 30' gradually fall down, the belt saws 70 are lowered to slice the stone S. Thus, the stone S is vertically sliced at once in conformity with the interval between the belt saws 70. In the present invention, since the belt saws 70 are only 3 mm in thickness, the amount of stone sliced away and consumed is greatly reduced, increasing, productivity by approximately 50% compared to the conventional circular shank type stone slicer.

INDUSTRIAL APPLICABILITY

According to the present invention, as platforms are lowered, a plurality of belt saws installed in parallel with each other rotate along an endless track, and slice stone placed on a base at a constant interval:

Since several stone plates are simultaneously obtained from rough stone, the manufacturing cost can be reduced. Also, since thin belt saws are used in slicing stone, the thickness of stone sliced and disposed away can be minimized and sludge generated by slicing can be reduced. Thus, the treatment cost of the sludge can be reduced and secondary environmental pollution can also be prevented.

What is claimed is:

1. A stone slicer, comprising:
   a base on which a stone is placed;
   four columns vertically installed at four respective edges of the base;
   a pair of platforms respectively installed on a left side and a right side of said base, and being adapted to simultaneously move up and down the columns, each platform having at least one of a driving pulley and a driven pulley;
   platform driving means for moving the platforms up and down;
   at least one endless belt saw having opposite ends, one of the ends being engaged with a driving pulley of one of the platforms, and another one of the ends being engaged with a driven pulley of another one of the platforms; and
   belt saw driving means for driving the belt saw to slice the stone placed on the base to a predetermined thickness, by rotating the driving pulley to thereby cause the belt saw to rotate along an endless track, the belt saw driving means comprising
   a driving motor;
   a helical gear connected to the driving motor, and horizontally extending in a direction from a rear of the one of the platforms to a front of the one of the platforms;
   a power transmission means including a driven belt or a chain coupled to said driving motor and said helical gear; and
   a vertical gear geared to the helical gear, the driving pulley being axially-aligned and connected to the vertical gear.

2. The stone slicer of claim 1, further comprising pairs of auxiliary pulleys respectively installed in a region of the driving pulley and the driven pulley, thereby imparting tension to the belt saw.

3. A stone slicer, comprising:
   a base on which a stone is placed;
   an upper plate disposed over said base;
   four columns vertically installed at four respective edaes of the base;
   a pair of platforms respectively installed on a left side and a right side of said base, and being adapted to simultaneously move up and down the columns, each platform having at least one of a driving pulley and a driven pulley, said platforms being threadedly engaged with the columns;
   platform driving means for moving the platforms up and down;
   at least one endless belt saw having opposite ends, one of the ends being engaged with a driving pulley of one of the platforms, and another one of the ends being engaged with a driven pulley of another one of the platforms; and
   belt saw driving means for driving the belt saw to slice the stone placed on the base to a predetermined thickness, by rotating the driving pulley to thereby cause the belt saw to rotate along an endless track;
   wherein the platform driving means include
   synchronized driving motors respectively installed at a left side and a right side of the upper plate, and which rotate forward and backward at a constant speed, sprockets respectively installed at upper ends of the columns, and chains respectively installed between two of the columns and one of the driving motors, and between another two of the columns and another one of the driving motors, whereby the driving motors cause the columns to rotate so that the platforms, which are threaded with the columns, are moved up or down as the driving motors rotate.

* * * * *